Sept. 8, 1942. B. FAGERSTRÖM ET AL 2,294,970
ROLLING MILL WITH OPERATING ROLLS AND SUPPORTING ROLLS
Filed Sept. 3, 1941 4 Sheets-Sheet 1

Sept. 8, 1942.   B. FAGERSTRÖM ET AL   2,294,970
ROLLING MILL WITH OPERATING ROLLS AND SUPPORTING ROLLS
Filed Sept. 3, 1941   4 Sheets-Sheet 3

Inventors:-
Bengt Fagerström
Knut Wilhelm Axel Lundström
By Howson & Howson, Attys Patented Sept. 8, 1942

2,294,970

UNITED STATES PATENT OFFICE 2,294,970

ROLLING MILL WITH OPERATING ROLLS AND SUPPORTING ROLLS

Bengt Fagerström and Knut Wilhelm Axel Lundström, Goteborg, Sweden

Application September 3, 1941, Serial No. 409,416 In Sweden August 14, 1940

9 Claims. (Cl. 80—55)

The present invention relates to a rolling mill having operating rolls and supporting rolls. The supporting rolls are used in order to strengthen the operating rolls, which are made with a small diameter in order to reduce the power-consumption in the rolling operation.

The operating rolls are subjected to both axial and radial forces. The axial forces are taken up by a thrust bearing arranged at one end of the operating roll. The radial forces acting upon the operating rolls are taken up by radial bearings, the inner and outer rings of which are relatively slidable in axial direction. Preferably roller bushings are used, which on account of their small extension in the radial direction admit the use of great journal diameters. The inner and outer rings of the radial bearing being axially moveable, the thermal expansion and contraction will meet no obstacle.

In known constructions of rolling mills the bearing housings of the radial bearings have been connected to the bearing housing of the thrust bearing by means of bolts extending along the rolls. Thus the thrust bearing housing served to fix the radial bearing housings in the axial direction. However these bolts which extend parallel with the rolls are impeditive during the rolling operation, complicate the changing of rolls and furthermore make the radial bearing housings rigid, so that they cannot adjust themselves freely when the roll journals are bent during the rolling operation.

The invention has for its purpose to obviate these disadvantages through a new improved arrangement for fixing the bearing housings of the radial bearings in the axial direction.

The invention will be further explained in connection with the accompanying drawings which show a rolling mill of the four high type.

Figure 1:
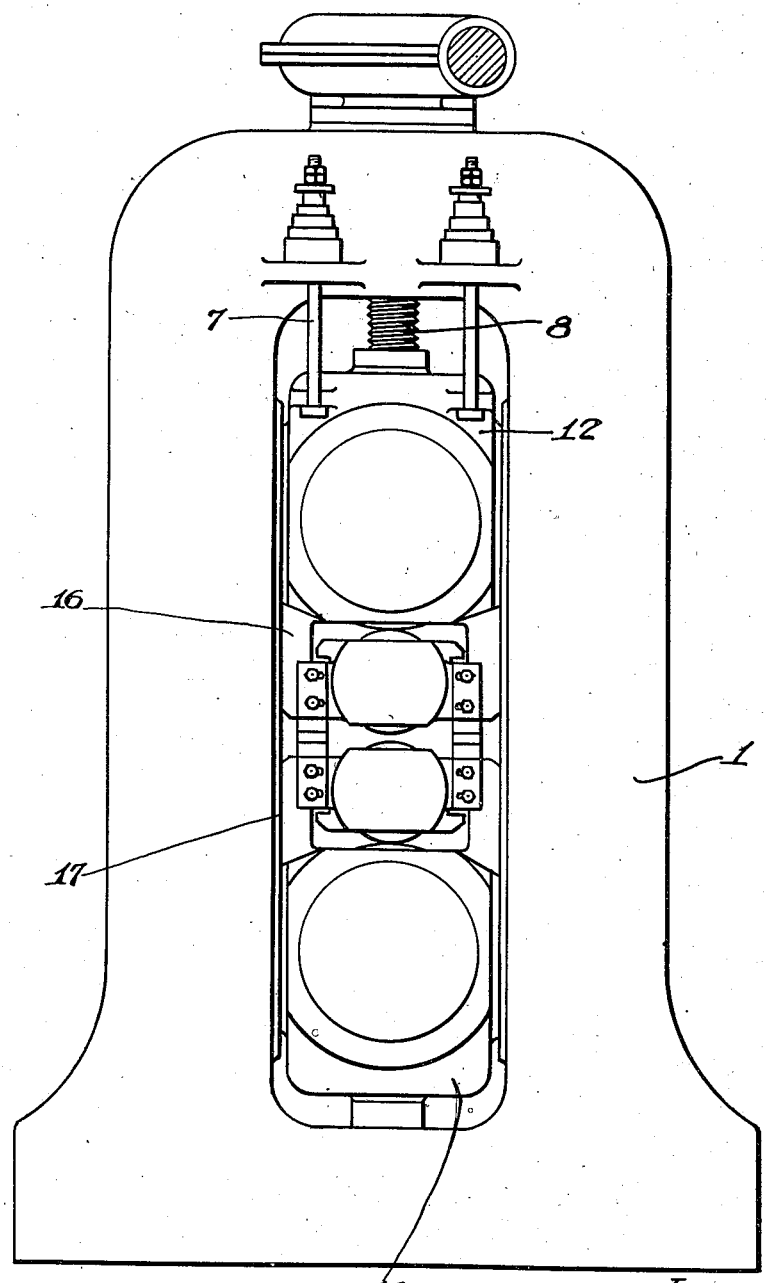
Figures 1 and 2 are vertical elevational views of the four high rolling mill.
Figure 2:
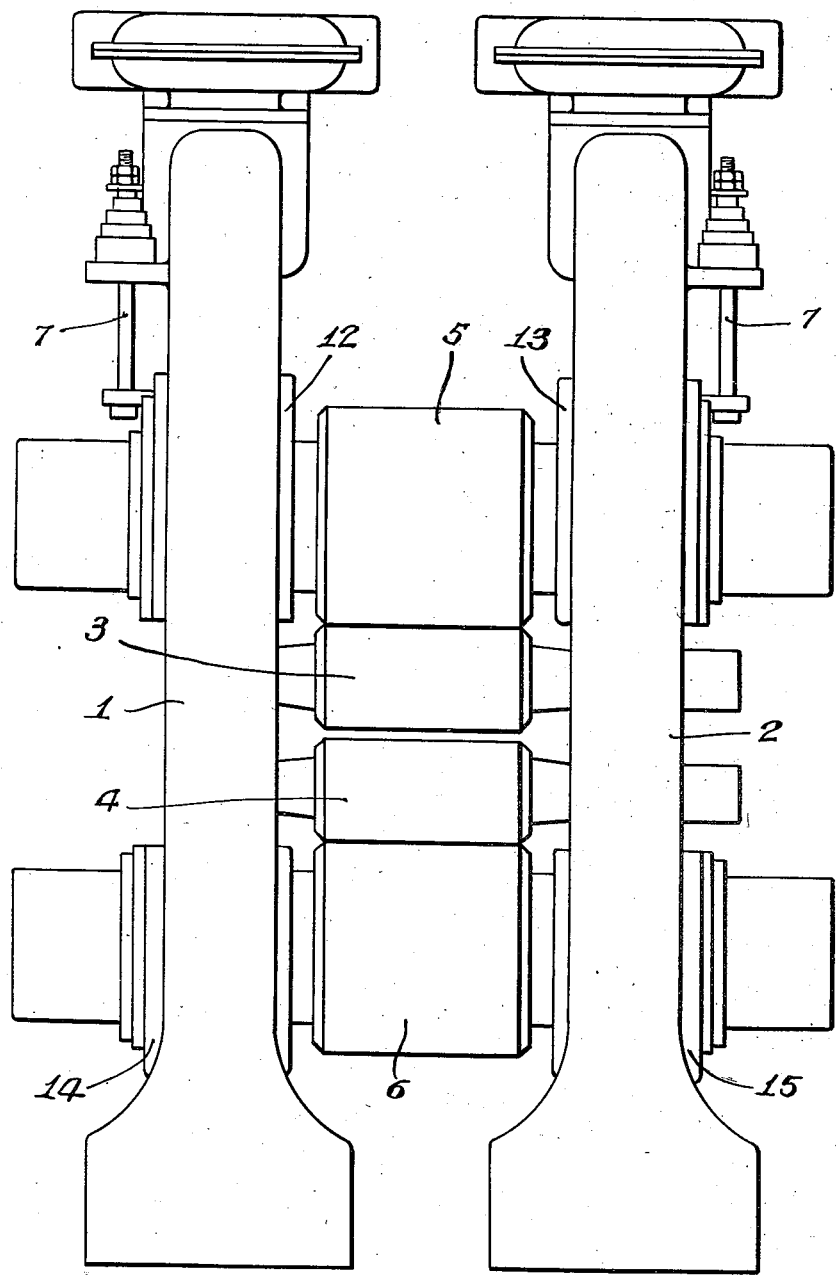

As best shown in Figs. 1 and 2 the four high rolling mill consists of a pair of supporting rolls 5, 6 and a pair of operating rolls 3, 4, which are placed in a pair of frames 1 and 2. The supporting rolls are not connected with any driving arrangement but are rotated through the friction against the operating rolls which in their turn are driven from the motor of the rolling mill. The upper supporting roll 5 which by means of suspension rods 7 is elastically suspended can be raised and lowered by means of the screws 8 and 9.

Figure 4:
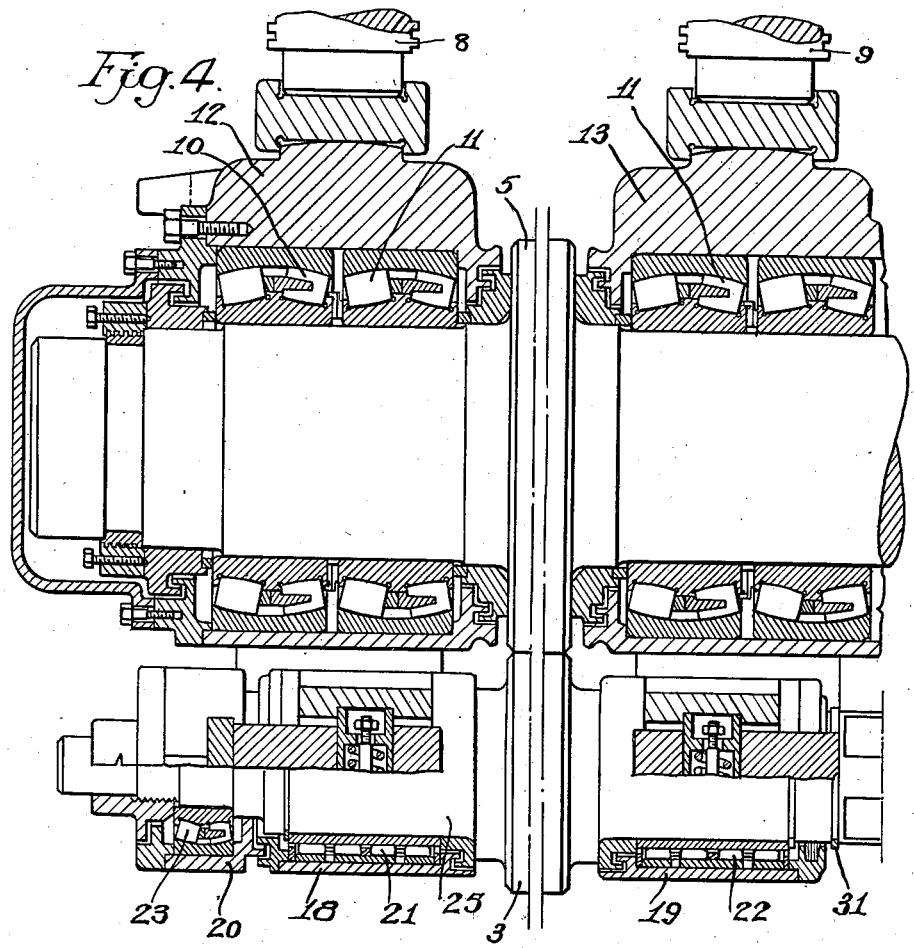
Fig. 4 shows a section along the line IV—IV in Fig. 3.

As shown in Fig. 4 the upper supporting roll 5 is mounted in two pairs of spherical roller bearings 10 and 11 in the bearing housings 12 and 13. In the corresponding way the lower supporting roll 6 is mounted in bearing housings 14 and 15 (Fig. 1–2). The bearing housings 12 and 14 are fixed in axial direction in the frame 1 and housings 13 and 15 are axially free in the frame 2.

Figure 3:
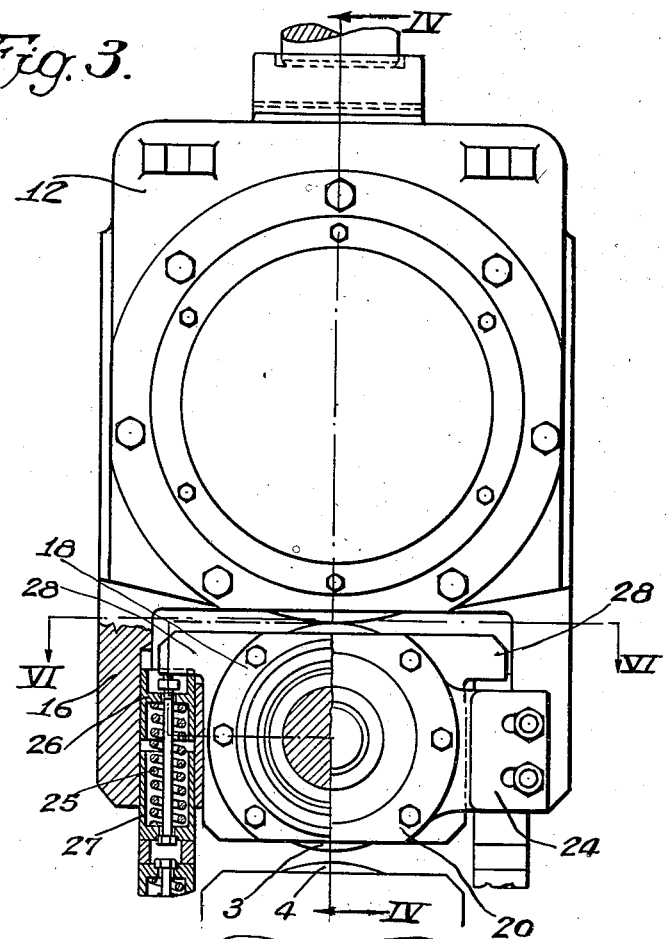
Fig. 3 shows more in detail and partly in section along line III—III in Fig. 6 an end elevation of the bearing housing of the upper operating roll and the upper supporting roll.
Figure 6:
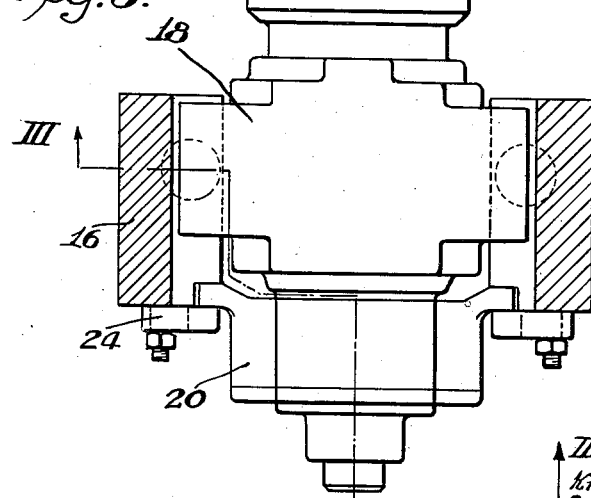
Fig. 6 shows a section along the line VI—VI in Fig. 3.

The bearing housings 12, 13, 14 and 15 for the supporting rolls 5 and 6 as shown in Fig. 1 and 3 are each provided with one pair of extensions 16 and 17 respectively between which the radial bearing housings 18 and 19 (Fig. 1, 3, 4 and 6) of the operating rolls are mounted. Furthermore the thrust bearing housing 20 is mounted between the extensions of the housings 12 and 14.

The upper operating roll 3 according to Fig. 4 is mounted in roller bushings 21 and 22 in bearing housings 18 and 19 to take up the radial forces. Each roller bushing consists of a set of small cylindrical rollers without any cage mounted between an outer and an inner ring. These bearings are not self-contained, that is the outer and inner rings can be separated from each other in the axial direction. Therefore the outer ring must be fixed in some way.

The roll 3 is at one end fixed in axial direction by means of a spherical roller bearing 23 (Fig. 4) serving as a thrust bearing and mounted in the bearing housing 20. The bearing housing 20 is bolted to the above-mentioned extensions 16 through the intermediary of plates 24.

The lower operating roll is mounted in a corresponding way.

Figure 5:
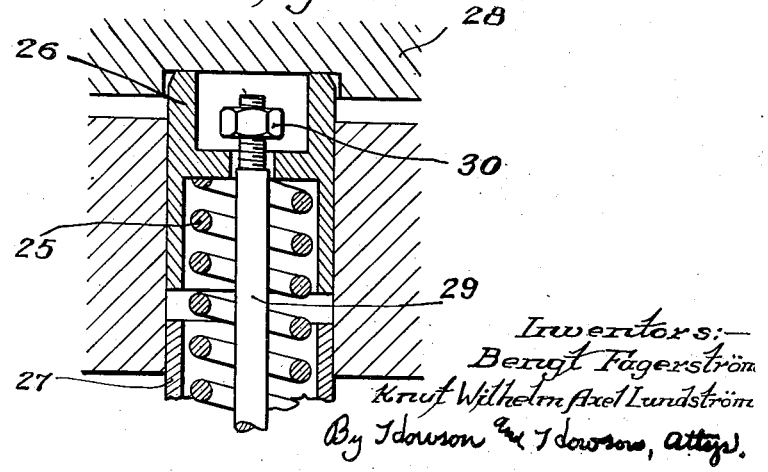
Fig. 5 shows a detail on a greater scale.

It is desired that the supporting rolls should be driven through the friction, also when the rolling mill is running unoccupied. Therefore the operating rolls are spring-pressed against the supporting rolls. This is obtained through the pressure springs 25 which are arranged in pairs and act between the radial bearing housings 18 and 19 of the operating rolls 3 and 4. Each spring is enclosed between two sleeves 26 and 27 which are slidably mounted in holes in the extensions 16 and 17 respectively of the bearing housings 12, 13, 14 and 15 of the supporting rolls (Fig. 3 and 5). The sleeve 26 is pressed against a shoulder 28 on the radial bearing housing 18 of the operating roll 3. The sleeve 27 is pressed against a disk in contact with a corresponding sleeve mounted in a hole in the extension 17 of the housing 14. The spring and the sleeves form together an expansible member, which holds the upper operating roll 3 pressed against the upper supporting roll 5. The upper supporting roll and the operating roll can be raised and lowered as a unit by means of screws 8 and 9 for the purpose of adjusting the opening between the two operating rolls.

As shown in Fig. 3 and 5 the shoulders 28 on the radial bearing housing 18 are provided with recesses with which the sleeve 26 for the pressure spring 25 is in engagement. The radial bearing housing thus will be connected in axial direction with the sleeve 26. The sleeves are guided in the respective extensions 16 and 17 of the bearing housing of the supporting rolls. Thus the radial bearing housings of the operating rolls will be axially connected with the adjacent bearing housings of the supporting rolls.

As stated above one end of the operating rolls is mounted in a thrust bearing, the housing 20 of which is bolted to the extensions 16 of the bearing housing 12 of the adjacent supporting roll. As also the radial bearing housing 18 is axially connected with the housing 12, the bearing housing 18 will be axially fixed in relation to the thrust bearing housing 20, and thereby the outer ring of the roller bushing is axially fixed to the inner ring thereof.

At the other end of the operating roll the radial housing of the operating roll is axially connected with the adjacent bearing housing of the supporting roll but axially independent of the inner ring of the roller bushing.

When the operating rolls are to be changed the thrust bearing housing 20 is loosened from the extensions 16, 17 by removing the plates 24. Then the upper rolls 3, 5 are raised by means of the screws 8 and 9. The springs are now expanded to a limit, which is determined by a bolt 29 and a nut 30 (Figs. 3 and 5). When the raising movement is continued the operating roll 3 will no longer follow supporting roll 5, nor do the sleeves. The upper sleeve 26 will slide out of the recess in the shoulder 28. Then the upper operating roll can be moved in axial direction together with the three bearing housings 20, 18 and 19 sitting on the roll. The bearing housing 18 is thereby held to the journal by labyrinth seals and the bearing housing 19 is held by a ring 31. In case of the lower operating roll it is necessary to lift the spring sleeve slightly upwards so that it comes out of engagement with the recess before the roll can be moved axially and taken out.

The mounting of the rolls is performed in a corresponding way. In order to facilitate the engagement between the spring-sleeve 26 and the recess in shoulder 28—the bearing housings are likely to move some millimeters corresponding to the axial play in the sealing—a certain play is at hand between the sleeves and the recesses as shown in Fig. 5, and furthermore the ends of the sleeves 26 are bevelled as shown.

The invention is not restricted to the embodiment shown in the drawings but also comprises different modifications thereof. Thus the invention can be applied to rolling mills having a different number of rolls than shown. The invention is generally useable in connection with rolling mills having one or more operating rolls and one or more supporting rolls.

We claim:

1. In a rolling mill with operating rolls and supporting rolls, the combination of a radial bearing for an operating roll, the inner and outer part of said radial bearing being relatively axially slidable, a spring enclosed in a sleeve connecting the bearing of the operating roll with the bearing housing of the adjacent supporting roll, the sleeve being slidably mounted in a guide formed in the bearing housing of the supporting roll, and the end of the sleeve located most adjacent to the supporting roll being in engagement with a recess in the bearing housing of the operating roll, for the purpose of axially guiding the bearing housing of the operating roll in dependence of the bearing housing of the supporting roll.

2. In a rolling mill with operating rolls and supporting rolls, the combination of a radial bearing for an operating roll, the inner and outer part of said radial bearing being relatively axially slidable, a sleeve disposed perpendicularly to the roll in a guide formed in the bearing housing of a supporting roll and being acted upon by a spring so as to hold the operating roll in contact with the supporting roll, the end of said sleeve being in engagement with a recess in the bearing housing of the operating roll, so that the sleeve forms an axial connection between the bearing housing of the operating roll and the adjacent bearing housing of the supporting roll.

3. In a rolling mill of the four high type the combination of a pair of operating rolls and a pair of supporting rolls, radial bearings in bearing housings for the operating rolls, bearing housings for the supporting rolls, sleeves enclosing springs and forming connections between the bearing housings of the operating rolls and the adjacent bearing housings of the supporting rolls so as to hold the operating rolls in contact with the supporting rolls, the sleeves located most adjacent to the supporting rolls being housed in guides in the bearing housings of the supporting rolls and having each one end in bearing engagement with a recess in one of the bearing housings of the supporting rolls.

4. In a rolling mill of the four high type the combination of a pair of operating rolls and a pair of supporting rolls, radial bearings in bearing housings for the supporting rolls, sleeves enclosing springs and forming expansible members extending perpendicularly to the rolls and parallel with a plane containing the axes of the rolls, the ends of the expansible members being in engagement with recesses in the bearing housings for the operating rolls, and the middle parts of the expansible members being slidably guided in the bearing housings for the supporting rolls.

5. A rolling mill according to claim 4 characterized thereby that the expansible members are provided with restricting means so as to limit the expansion thereof.

6. Rolling mill of the four high type according to claim 4 in which the expansible member is extending from a recess in the radial bearing housing of the lowermost operating roll to a recess in the radial bearing housing of the uppermost operating roll, the middle part of the expansible member extending through guides formed in the bearing housings of the uppermost and lowermost supporting roll.

7. In a rolling mill with operating rolls and supporting rolls the combination of two bearing housings for a supporting roll, two bearings for an operating roll arranged at both ends thereof and having their inner and outer rings mutually slidable, and a thrust bearing for the operating roll arranged at one end thereof and firmly connected with the adjacent bearing housing of the supporting roll, sleeves enclosing springs forming expansible members mounted in guides arranged in extensions of the bearing housings of the supporting roll and directed perpendicularly to the roll axes and parallel with a plane containing the roll axes, one end of said expansible members being in engagement with a recess in the adjacent bearing housing of the operating roll, the thrust bearing housing being mounted on the adjacent bearing housing of the supporting roll.

8. A rolling mill according to claim 6 characterized by restricting means to limit the expansion of the expansible members.

9. A rolling mill of the four high type according to claim 6 in which the expansible member is extending from a recess in the radial bearing housings of the lowermost operating roll to a recess in the radial bearing housing of the uppermost operating roll, the middle part of the expansible member extending through guides formed in the bearing housings of the uppermost and lowermost supporting roll.

BENGT FAGERSTRÖM.
KNUT WILHELM AXEL LUNDSTRÖM.